M. TIBBETTS.
HYDROCARBON MOTOR.
APPLICATION FILED JULY 18, 1912.
1,141,288.
Patented June 1, 1915.
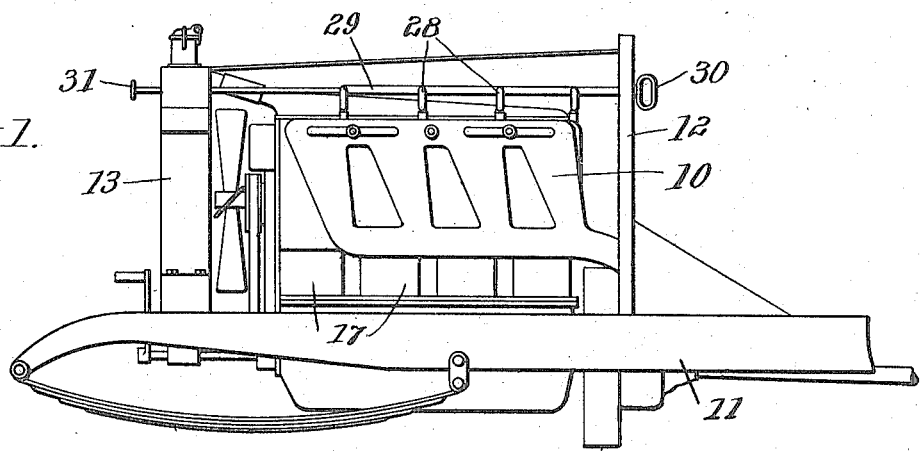
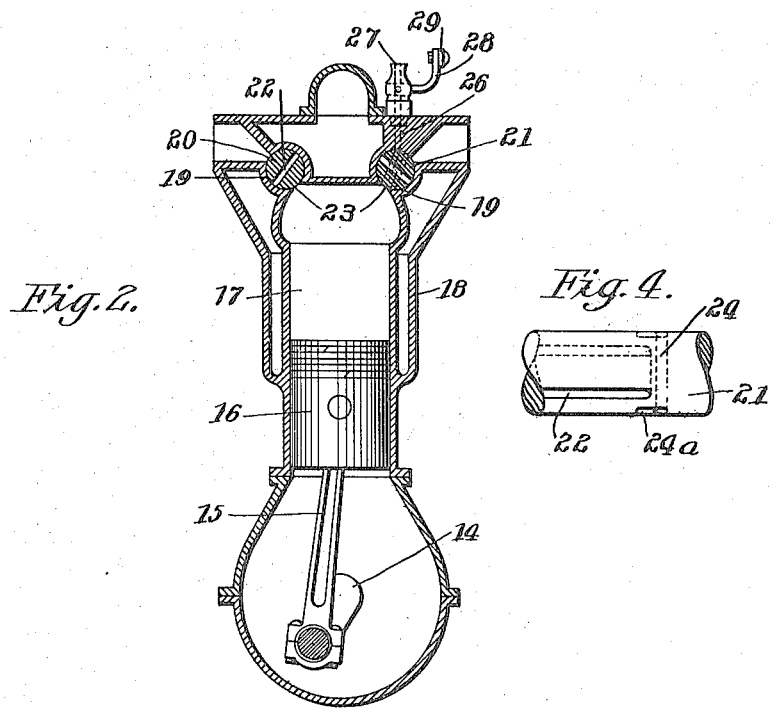
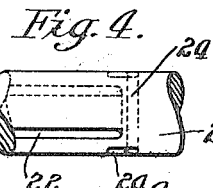
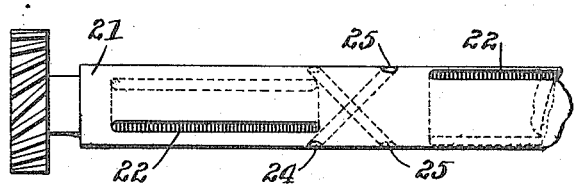
WITNESSES
INVENTOR,
Milton Tibbetts.

UNITED STATES PATENT OFFICE.

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN.

HYDROCARBON-MOTOR.

1,141,288.  Specification of Letters Patent.  Patented June 1, 1915.

Application filed July 18, 1912. Serial No. 710,310.

*To all whom it may concern:*

Be it known that I, MILTON TIBBETTS, a citizen of the United States, and resident of Detroit, Wayne county, State of Michigan, have invented certain new and useful Improvements in Hydrocarbon-Motors, of which the following is a specification.

This invention relates to hydrocarbon motors and particularly to motors of this type using rotary valves. In motors of this type for use on motor vehicles or motor boats various devices are provided for relieving the cylinder pressure during the compression stroke of the motor for the purpose of making "cranking" easier. In a four-stroke cycle motor it is desirable that the cylinder be open to the atmosphere to relieve the pressure during a part only of the compression stroke, and during the remainder of this stroke the cylinder should be closed.

An object of the present invention is to so construct a motor of the above referred to type that the compression of each cylinder may be relieved at the proper time in its cycle, and the mechanism for doing so may be of simple construction and easily controlled by the operator.

The invention may be said to be an improvement over the motor shown in patent to Russell Huff No. 1,006,095 dated Oct. 17, 1911, the present structure dispensing with the necessity for moving the rotary valve endwise in order to bring the relief ports into operation.

Another object of the invention is to so mount the motor on a motor vehicle and to make such connections that the relief valves may be operated either from the operator's seat or from a position in front of the vehicle.

Other objects of the invention will be apparent from the following description, taken in connection with the drawings, in which, Figure 1 is a side elevation of a vehicle motor embodying my invention; Fig. 2 is a vertical section through the motor; Fig. 3 is a detail view of a portion of one of the rotary valves; and Fig. 4 is a detail view of another form of valve.

Referring to the drawings, the motor is shown as applied to a motor vehicle and in Fig. 1 the motor is represented at 10 supported on the cross bars 11 of the motor vehicle frame between the dash 12 and the radiator 13. In the sectional view the crank shaft 14 may be seen together with the connecting rod 15 and piston 16 which reciprocates in the cylinder 17, of which cylinders there are four as shown particularly in Fig. 1. The cylinders 17 are shown as water jacketed at 18, and there are shown two longitudinal bores 19 in which are arranged the rotary inlet valve 20 and the rotary exhaust valve 21. It will be understood that these valves are driven from the crank shaft by any suitable means and preferably at a ratio of one revolution of the valves to four revolutions of the crank shaft.

The valves are formed with suitable main ports 22 which are shown as through ports whereby they are caused to open the cylinder ports 23 twice during each revolution.

So far as the operation of these main ports is concerned the action is the same as that of the motor shown in said Huff Patent 1,006,095.

In practice it has been found inadvisable to shift the exhaust valve endwise as in said Huff patent for the purpose of bringing the auxiliary or relief ports into operation, and by the present invention this endwise movement of the exhaust valve is eliminated.

In addition to the main ports 22 in the exhaust valve 21 there are two auxiliary ports 24 which extend diagonally through the valve. Each of these ports 24 has one of its ends in a transverse plane with the adjacent main port 22 so that this end of said port 24 registers at each revolution of the valve with the port 23 of the cylinder and it is so disposed relative to said main port 22 that it will register with said cylinder port 23 during a part of the compression stroke of the piston. While one end of each of said ports 24 is registering with the cylinder port 23, its other end, indicated at 25 in Fig. 3 is registering with an auxiliary port 26 formed in the cylinder wall as shown particularly in Fig. 2. This auxiliary port 26 is controlled manually by a valve 27 mounted on the cylinder and as there are four cylinders in the motor shown there are therefore four of these relief valves 27 as shown in Fig. 1, and their operating handles 28 are preferably connected together by a rod 29 so that they may be operated simultaneously. The rod 29 may extend longitudinally of the motor and have a handle 30 connected at one of its ends on the operator's side of the dash 12, and a knob 31 at its forward end so that it may be operated from the front of the vehicle when the operator is about to crank the motor.

It will be understood that when the valve 27 is closed the port 26 is cut off from the atmosphere and the ports 24 are thereby inoperative. This is the normal position of the valve as the relief ports are of course intended to be brought into operation only when it is desired to relieve the compression in the cylinders, as when cranking.

It will be further understood that the ports 24 do not intersect each other in the valve 21 but are independent ports as shown in dotted lines in Fig. 2. There are two of these ports for each cylinder where the valve rotates at one to four in a four-cycle motor, but of course only one port 24 would be necessary if the valve were rotated at two to one.

In Fig. 4 a slightly modified form of auxiliary port is shown. In this case, instead of drilling the ports 24 diagonally, the ports are drilled straight through at points adjacent the main ports 22 and branches or by-passes 24ª are milled in the valve so that one end of each of the ports 24 will communicate with the cylinder port 23 at each revolution of the valve.

Having thus described my invention what I claim and desire to secure by Letters Patent is:

1. In a hydrocarbon motor, the combination with the cylinder and a rotary valve, means in said valve independent of the main valve port for relieving the cylinder pressure during a part of the compression stroke of the motor, and means operative manually independently of the valve for controlling the action of said first means.

2. In a hydrocarbon motor, the combination with the cylinder and a rotary valve, of means operative with the valve in its normal operative position for relieving the cylinder pressure during a part of the compression stroke.

3. In a hydrocarbon motor, the combination with the cylinder and a rotary valve, of means operative with the valve in its normal operative position for relieving the cylinder pressure during a part of the compression stroke, and means for manually controlling the operation of the first said means.

4. In a hydrocarbon motor, the combination with the cylinder and a rotary valve, of means operative with the valve in its normal operative position for relieving the cylinder pressure during a part of the compression stroke, and a valve for manually controlling the operation of said means.

5. In a hydrocarbon motor, the combination with the cylinder having a port and a rotary exhaust valve, said valve having a main exhaust port and an auxiliary exhaust port, both of which ports are constantly in a registering plane with the cylinder port, of means for normally maintaining said auxiliary port inoperative and for bringing said auxiliary port into operation.

6. In a hydrocarbon motor, the combination with the cylinder having a port, and a rotary exhaust valve, said valve having a main exhaust port and an auxiliary exhaust port, both of said exhaust ports being constantly in a registering plane with the cylinder port, of means outside the valve for controlling the operation of said auxiliary port.

7. In a hydrocarbon motor, the combination with the cylinder having intake and exhaust ports, and a valve mechanism controlling said ports including a rotary valve having a main port adapted to register with said exhaust port, and having an auxiliary port adapted to register with said exhaust port, and with an auxiliary port in the cylinder, and means for manually controlling said cylinder auxiliary port.

8. In a multi-cylinder hydrocarbon motor, the combination with the cylinders having inlet and exhaust ports, of a rotary valve for the inlet ports and a rotary valve for the exhaust ports, one of said rotary valves having a relief port for each cylinder adapted to be brought into operative relation with the cylinder exhaust ports when the pistons are on their respective compression strokes, and means operative with the latter said valve in its normal operative position for manually controlling the operation of said relief ports.

9. In a multi-cylinder hydrocarbon motor, the combination with the cylinders having inlet and exhaust ports, of a rotary valve for the inlet ports and a rotary valve for the exhaust ports, said rotary exhaust valve having a relief port for each cylinder adapted to be brought into operative relation with the cylinder exhaust ports when the pistons are on their respective compression strokes, and means including valves mounted on the cylinders for controlling the operation of said relief ports.

10. In a multi-cylinder hydrocarbon motor, the combination with the cylinders and a rotary valve extending lengthwise of the motor, relief ports in said valve, valves on said cylinders controlling the operation of said relief ports, interconnecting means between said valves, and means at either end of said motor for operating all of said valves.

In testimony whereof I affix my signature in the presence of two witnesses.

MILTON TIBBETTS.

Witnesses:
 Le Roi I. Williams,
 J. C. Rink.